United States Patent [19]

Perl et al.

[11] 4,392,963

[45] Jul. 12, 1983

[54] RESORCINOL OR PHLOROGLUCINOL CONDENSATION PRODUCT FOR AQUEOUS MIXTURE PURIFICATION

[75] Inventors: Horst Perl; Dietmar Nussbaumer, both of Göttingen; Horst Klüver, Dransfeld; Hans Beer, Göttingen, all of Fed. Rep. of Germany

[73] Assignee: Sartorius GmbH, Göttingen, Fed. Rep. of Germany

[21] Appl. No.: 245,957

[22] Filed: Mar. 20, 1981

[30] Foreign Application Priority Data

Mar. 26, 1980 [DE] Fed. Rep. of Germany ....... 3011739

[51] Int. Cl.³ .......................... C02C 5/02; B01D 15/00
[52] U.S. Cl. .................................... 210/692; 210/282; 210/290; 210/321.3

[58] Field of Search ............... 210/670, 683, 685, 687, 210/692, 749, 927, 263, 284, 282, 290, 321; 521/26, 35, 36, 37, 39

[56] References Cited

U.S. PATENT DOCUMENTS 2,104,501  1/1938  Adams et al. ........................ 210/681
3,186,940  6/1965  Vajna .............................. 210/685 X

*Primary Examiner*—David R. Sadowski
*Attorney, Agent, or Firm*—Browdy & Neimark

[57] ABSTRACT

Incompletely condensed aldehyde resin having a large surface area and formed in the presence of large quantities of water under mild conditions is used for removing waste products, such as urea, from the blood in hemodialysis or for removing such impurities from swimming pools or aquariums.

16 Claims, No Drawings

RESORCINOL OR PHLOROGLUCINOL CONDENSATION PRODUCT FOR AQUEOUS MIXTURE PURIFICATION

FIELD OF THE INVENTION

The present invention relates to the cleansing of fluids, and more particularly to the removal of substances from fluids, especially substances which must be eliminated from the body in the urine.

BACKGROUND OF THE INVENTION

The removal from fluids of urea-like waste substances such as those which must be eliminated from the body in the urine plays a particularly important role in the extra-renal cleansing of the blood in artificial kidneys; however, this problem also arises in other technical fields, such as the removal of urea, ammonia and the like from the water in swimming pools and aquariums.

In medical dialysis technology, the tendency is toward appliances which are as compact as possible and thus portable. The volume of the dialysis medium is small, and the dialysis medium or hemofiltrate must be continuously regenerated in order to remove the waste product from it. This regeneration is accomplished inside a cartridge which contains compounds capable of decomposing or absorbing the waste products. Because urea and other substances which are normally eliminated from the body in the urine have a low capacity for reacting chemically under physiological conditions, the problem of removing these compounds from the dialysis medium and the hemofiltrate has not yet been solved satisfactorily.

There are appliances on the market in which urea is converted into ammonia by means of urease, and other substances normally eliminated from the body in the urine are removed by absorption means or by ion exchangers. Activated charcoal serves as absorption means, and zirconium phosphate and zirconium oxide, for example, are used as ion exchangers. The disadvantage in this case is that urease is sensitive to heavy metals, so that cleansing to remove all enzymatic toxins must be carefully performed. This requires taking expensive additional steps and increases the volume of the cleansing cartridge which is needed.

It is furthermore known to use complexing compounds bonded to a polymer, in order to attain this object. According to German Disclosure Document DE-OS No. 27 34 741, xanthhydrol or a xanthhydrol derivative is bonded to a natural or synthetic polymer, such as polystyrene. The paper by Owen et al entitled "Hemoperfusion, Dialysate, Diafiltrate Purification", from the symposium at Tutzing (Federal Republic of Germany), Sept. 11-13, 1978, discloses the bonding of phloroglucin and dihydroxybenzoic acid to ion exchangers, such as Sephadex, and the utilization of these polymer-bonded complexers for the purpose of urea absorption.

The attempt has also been made to use macromolecular compounds, such as oxygenated starch and oxycellulose, directly in order to remove urea from the dialysis medium via chemical reactions. However, this has had unsatisfactory results (see the paper, referred to above, from the Tutzing symposium).

The polymer-bonded complexes disclosed have various disadvantages. For instance, their absorption capacity is comparatively small, because the polymer component does not contribute anything to the absorption results. For the polystyrene compound known from the German Disclosure Document cited above, the calculation is that 1 g of the compound is theoretically capable of bonding 90 mg of urea. In the case of the Sephadex compound known from the Owen paper, the data given (which are, in part, contradictory) indicate a theoretical capacity between 16.5 and 33 mg/g. It is furthermore disadvantageous that the known polymers are chain-linked, one-dimensional high polymers in which the danger is extremely likely that products of separation will be released which cannot be metabolized in the human body. One disadvantage of the known products, which should not be underestimated, is that the cost of manufacturing them is comparatively high; there is also the fact that they are just as incapable of bonding phenols and phenolic and aromatic amino acids, which in patients suffering from uremia must also be eliminated from the body, and middle-sized molecules (300 to 20,000 Daltons) as they are of bonding $Mg^{2+}$, $K^+$, $PO_4^{3-}$, $SO_4^{2-}$, creatinine and uric acid.

SUMMARY OF THE INVENTION

In contrast to the above, it has been demonstrated that in accordance with present invention phenol aldehyde resins having a very large surface area and which are produced under suitable conditions are capable of absorbing urea, ammonia, amines, amino acids and phenols and even formaldehyde in a particularly advantageous manner; after suitable follow-up treatment, they are also able to absorb $K^+$, $Mg^{2+}$, $PO_4^{3-}$, and $SO_4^{2-}$ and to desorb $Ca^{2+}$.

The incompletely condensed phenol aldehyde resins having a large surface area prepared according to the present application are especially used as a filling for cartridges intended for the extrarenal cleansing of physiological fluids. Additionally they can be used for the cleansing of water especially for removing traces of amines from anion exchanger liquids. Strongly basic anion exchangers release appreciable amounts of amines. These can be removed by utilisation of the aldehydes prepared according to the present application in small amounts. Also fines obtained by abrasion of ion exchangers consisting of low molecular weight styrene polymers can be bound to the resins prepared according to the present invention. Preferably the resins prior to their use for this purpose are rinsed to free them from salts.

An additional possibility of use is on the field of biochemistry. Polyfunctional enzymes having phenols, amine groups or reactive double bonds can be separated by these resins from very diluted solutions. Some of these enzymes maintain their activity even if they are coupled with aldehydes. This creates the possibility to use the resins as enzyme carriers. Like the enzymes also proteins and amino acids are bound which especially in lower concentrations without use of flocculating agents scarcely can be bound quantitatively.

Traces of phenols cannot be removed from pure water by using conventional methods. In contrary thereto the resins obtained according to the invention are capable to bind these phenols very well in such an extent that they are no more detectable by biochemical methods.

Because of the capability to absorb $NH_x$-compounds also cancerogenic materials like substituted hydrazines and hydroxylamine can be bound by the resins of the present invention. Among additional NH-compounds which can be bound by using the resins prepared according to the invention also bacteria and viruses are mentioned because they have NH-functions in a great extent, and can therefore be bound and desactivated by the resins. This creates the possibility of an "active filtration".

Additionally, the resins obtained according to the present invention can be used for the absorption of aldehydes from fluids. In this connection for example the separation of aldehyde fuel oils from alcohol should be mentioned.

The resins which are utilizable in accordance with the present invention have the advantage not only that they are capable of absorbing numerous further substances which must be eliminated from the body, but also, in contrast to the prior art, that their theoretical absorption capacity for urea is substantially greater, being at approximately 170 mg/g; that they are spatially linked, three-dimensional structures having minimal solubility and practically no tendency to form products of separation; and that they can be produced at comparatively favorable prices, which are estimated to be only about 1/10 to one half of the cost for products known from the German Disclosure Document or the paper by Owen et al cited above.

DETAILED DESCRIPTION OF EMBODIMENTS

The manufacture of phenol aldehyde resins is well known. However, in accordance with the invention only products having a large surface area and which have been condensed in a particularly protective and incomplete manner can be used; these products are obtained by means of the condensation of a phenol or of a mixture of several phenols, under acidic or alkaline conditions with a comparatively high concentration of water and salt, in the presence of catalysts such as $Ca^{2+}$, $Mg^{2+}$, $Zn^{2+}$, $Fe^{3+}$ with formaldehyde, or a mixture of formaldehyde and other aldehydes.

The manufacture of the phenol aldehyde resins which can be utilized in accordance with the invention is advantageously performed such that free methylol groups remain in the ortho-position relative to the hydroxyl group;

the condensation takes a course such that if possible two OH groups of the phenols are located in the vicinity of one another;

the reaction takes its course under mild conditions, at approximately 40°-90° C.;

the reaction is guided by means of the addition of other phenols and/or aldehydes or additions such as cellulose in such a way that a further condensation of methylol groups is not possible; and polycondensates having large surface areas and/or being capable of swelling in water are obtained by means of additives such as salts and compounds which are easily soluble in water.

Depending upon the reaction conditions, a difunctional aldehyde can also be used in deficiency for precondensation purposes, and formaldehyde can be caused to react subsequently.

Phenol aldehyde resins which with aldehyde were kept in a state of deficiency, without phenol entering into solution in measurable amounts, bond formaldehyde out of a solution at 37° C.

Preferred phenols are phenol, catechol, resorcinol, hydroquinone, phloroglucinol, pyrogallol, and tetrahydroxybenzene; and preferred aldehydes are formaldehyde, acetaldehyde, glyoxal, malonic aldehyde, glutaric dialdehyde, and furfural or their methyl or ethyl acetals.

The phenol/aldehyde ratio used is dependent on the type of compounds used. If the resin is intended to contain a large number of methylol groups, then 2-4 Mol of formaldehyde, or of a mixture of formaldehyde and other aldehydes, is required per Mol of phenol. However, the quantity of formaldehyde used must be at least great enough that no phenol enters into solution.

If resorcinol is used as the phenol, then the minimum quantity of formaldehyde is 2 Mol; a slight surplus of formaldehyde causes the identification of phenol to become negative. Usable in any case according to the invention are resins which contain only 1.7 Mol of formaldehyde per Mol of resorcinol.

When resorcinol and glutaric aldehyde are used, a quantity ratio of 2 Mol of resorcinol per Mol of glutaric aldehyde has proved to be advantageous. At higher quantities of resorcinol, phenol entering into solution can be identified.

A quantity ratio of phenol to dialdehyde of 4:1 has proved successful, with the addition of 0.1 to 2.0 Mol of formaldehyde; a preferable ratio of phenol to dialdehyde is 2:1, with the addition of 1 Mol of formaldehyde.

In principle, an appropriately adapted method must be applied for each combination of phenol/aldehyde or mixtures thereof, because the condensation conditions differ for each type of initial compound. For instance, pyrogallol reacts with formaldehyde only in a highly alkaline or highly acidic medium; in contrast, pyrogallol reacts with glyoxal only in a highly acidic range. When acetals are used, the medium must be highly acidic (except with formaldehyde), because acetal breakup is catalyzed by acidic conditions.

As may be seen from the results tabulated below in Table IV, it is particularly advantageous to have high salt concentrations and large quantities of water so as to attain a resin having a particularly large surface area which bonds relatively very high quantities of urea.

Ca—, Mg—, Zn— and Fe (III) compounds have proved to be particularly good catalysts; in principle, other compounds may also be used, if care is taken that they are completely removed after the chemical reaction has taken place. Examples of such compounds are Li—, Ba—, Sr— and Mg— ions; Cu, Cr, Ni, Co, Mn and Zn salts; and boric acid and phosphoric acid, which prove to be toxic.

$Fe^{3+}$ must also be removed, if it is present in relatively high concentration; however, remnant traces can be tolerated, because in any case the human daily requirement is 10 mg, and 3 kg of resin, after treatment lasting 3 days, generally releases only from 3 to 10 mg of $Fe^{3+}$. When $Fe^{3+}$ is used as a catalyst, the reaction must at first take place in the acidic range from approximately pH 2 to 2.5, since $Fe(OH)_3$ is present in the alkaline range. After being flushed out in order to remove the iron, the preliminary product is thus acidic; and if it were immediately treated further with formaldehyde, then under these conditions $CH_2$ bridges would be formed and only a very few $CH_2OH$ groups, as is known from the literature. It must therefore be made alkaline once again; this is advantageously effected with $Na_2CO_3$, which of course is also a catalyst, or with $NaHCO_3$. Preferably a pH value of approximately 8 is selected, because excessive alkalinity (pH values above 11, for instance) promotes the Cannizzaro reaction, forming COOH groups from $CH_2OH$ groups in the phenol. With this method, the solution must be warmed during the condensation reaction with formaldehyde if small quantities (of approximately 1 Mol) are used, while larger quantities generate heat on their own. This heating is effected only in order to make the initial product, which has already expanded in moisture, sufficiently insoluble in the case of two-stage condensation.

The compounds used and functioning as catalysts have the further function, in the method of the invention, of forming bonds with the OH groups of the phenols and thus accumulating water on their own. As a result of this bonding of water near the OH groups of the phenols, the resins are made capable of expanding in moisture.

Depending upon the type of catalyst used, concentrations of approximately 0.035 Mol/Mol of phenol up to 1 Mol/OH group of the phenol accordingly prove to be useful or effective. High concentrations of up to 1 Mol are usable, for instance when NaCl, NaHCO$_3$ or NaOH are used; the last-named compound, because of its highly alkaline reaction, triggers an abrupt polymerization.

It has proved to be particularly advantageous to use $Ca^{2+}$, for example, in concentrations of 0.1 Mol per Mol of phenol, or $Fe^{3+}$ in concentrations of 0.5 Mol per Mol of phenol, both in the acidic and the alkaline range.

The resin which has been condensed either under acidic or alkaline conditions is then neutralized, if it is intended for medical purposes, to pH 6.8 to 7.2, because the human body tolerates approximately pH 6.6 to 7.4. Because in any case soluble components which still remain must be flushed out of the resultant resin, and this flushing tends to bring about a pH value in the neutral range, washing is a useful method of neutralization. Neutralization is effected more rapidly by means of the addition of Na$_2$CO$_3$, for instance, in the case of resins condensed under acidic conditions, or by means of the addition of 0.001 N—HCl in the case of resins condensed under alkaline conditions. Hydrochloric acid is effective in the strength indicated, because at a pH value of approximately 3, the methylol groups continue to react only very slowly under cold conditions. After the neutralization has been effected with chemicals, washing is performed using water.

Resins obtained in this manner split off only a very small amount of formaldehyde, and after being carefully dried they retain their activity over long periods of time.

A followup treatment of the resins obtained, using K$_2$S$_2$O$_5$, Na$_2$S$_2$O$_5$, KHSO$_3$, NaHSO$_3$ or H$_2$SO$_3$ and/or NaBH$_4$, for example, not only eliminates non-decomposed formaldehyde by means of adduct formation; after being thoroughly washed, it also leads in a particularly advantageous manner to compounds which, after being charged with calcium ions, in the form of Ca(HCO$_3$)$_2$ for instance, absorb potassium, magnesium, phosphate and sulfate and release calcium; they are furthermore capable of shifting the pH value of weakly alkaline or acidic solutions into the neutral range.

This followup treatment is accordingly advantageously effected in such a manner that first the remnant formaldehyde content of the resin is determined, and then flushing is effected with a tenfold excess of treatment medium. Finally, flushing is performed with cold water; when sulfur-containing treatment mediums are used, this flushing is performed until such time as there is negative evidence of Na$^+$ and SO$_3^{2-}$. The $Ca^{2+}$ and $Fe^{3+}$ ions used as catalysts presumably form chelate structures, in which they are associated up to sixfold with resorcinol-OH groups. These ions are irreversibly bonded up to a certain extent by the subsequent condensation, forming octahedral spaces having up to six OH groups, similar to zeolites. Iron contained therein is capable of bonding PO$_4^{3-}$ in the form of iron phosphate, and $Ca^{2+}$ contained therein precipitates out SO$_4$ as poorly-soluble CaSO$_4$; $Mg^{2+}$ can easily be exchanged for $Ca^{2+}$, or it finds its way into gaps created by the flushing operation. Potassium is adsorbed in the identical manner, while because of its higher nuclear charge $Fe^{3+}$ remains bonded to a better extent.

Heating proves to be disadvantageous as a means for drying (which is demonstrably necessary because damp resins react to split off formaldehyde), because temperatures are then attained which are high enough for further condensation and result in an inactive resin no longer capable of swelling in water. Chemical drying can be performed using conventional, known means; however, the result is higher consumption of chemicals. The methods of spray drying and freeze drying are accordingly attractive, and freeze drying has proved to be effective.

After condensation, the resin generally appears in the form of a solid block, and if 1 kg resorcin with formaldehyde, for example, is condensed in an alkaline environment with Na$_2$CO$_3$, with CaCl$_2$ acting as a catalyst, then the product of polymerization is a solid, light-yellow block, which slowly turns red as air enters and is capable of containing up to 8 kg of water.

Comminution of this solid material to a predefined grain size proves to be particularly advantageous if it is to be used for medical purposes, attaining sufficient and especially uniform flow-through of dialysis medium and preventing fine components from plugging the filters. Grain sizes of approximately 0.02 to 0.2 mm and preferably from 0.05 to 0.1 mm have proved to be particularly suitable.

The comminuted resin, conditioned as necessary and dried, can be used as a filling for cartridges intended for the extrarenal cleansing of physiological fluids. The expense for the appliance itself is lower than in the case of products already known and available on the market, such as the "Redy" dialysis system which functions with urease, because the necessity for removal of enzymatic toxins and the ventilation of CO$_2$ is eliminated.

Cartridges of this kind can be equipped for the purpose of long-term hemofiltration or hemodialysis such as peritoneal dialysis. A dry cartridge which is usable in the conventional manner—that is, for a period of 4–5 hours every three days—may contain, for example, approximately 3 kg or resin of a type corresponding to Example 1 or Example 2, approximately 1 kg of resin of a type corresponding to Example 3, and approximately 150–200 g of activated charcoal. Activated charcoal may in some cases not be required; however, if present, it should precede the resin for the purpose of bonding creatinine and uric acid. A cartridge of this kind must then be flushed out beforehand in the conventional, known manner.

A smaller, portable cartridge, which has already been flushed and is accordingly ready for use, needs to contain only approximately 250 g of resin of the type according to Example 1 or 2, approximately 100 g of resin of the type according to Example 3, and approximately 50 g of activated charcoal. A cartridge of this kind then, together with a suitable miniature filter module for long-term applications, results in a portable artificial kidney wherein the cartridge should be changed every 6 hours.

The bonding of ammonia, which is present in the resin only in small quantities, may also be effected with the aid of the resins usable in accordance with the invention; alternatively, it may be effected in a known manner with the aid of zirconium phosphate. However, there is particular significance in the absorption of ammonia with the aid of the resins usable in accordance with the invention when this is associated with the purification of waste water or the exclusion of amines from ion exchanger columns for the purpose of total desalination, because highly alkaline ion exchangers in the OH form give up amines particularly readily.

The fact that resins which are usable in accordance with the invention exist which have the capacity to absorb formaldehyde (see Example 3) is particularly advantageous, especially since these resins are required for bonding the formaldehyde which has been released from the absorber resin.

Since it is known from measurements of the $NH_3$ absorption that the resins always absorb approximately 10 to 20% more ammonia than urea, one is justified in concluding that two $CH_2OH$ groups and two OH groups must always be located close together for absorption purposes; this is easily attained using known ortho-catalysts.

The following examples are intended to explain the invention in further detail.

EXAMPLE 1

1 Mol of resorcinol and 0.33 Mol of $FeCl_3$ were dissolved in 250 ml of water and brought with a saturated $Na_2CO_3$ solution to a pH of 8; at this point, 1 Mol of formaldehyde (37% solution with 10% methanol) was added. The reaction was carried out such that the temperature remained below 60° C.

After the reaction had ended, the product was held at 60° C. for four hours and subsequently brought to pH 2 with HCl and then washed iron-free. After the pH value had been brought into the alkaline range, to a pH below 10, using $Na_2CO_3$, further formaldehyde (2 Mol) was added and the product was held at 70° C. for four hours.

The resin thus created was neutralized, washed until it was free of salts and formaldehyde, comminuted to a grain size between 0.05 and 0.1 mm, and conditioned with $K_2S_2O_5$ and $NaBH_4$. Treatment with a $Ca(HCO_3)_2$ solution and finally washing and freeze-drying produced a compound which was capable of absorbing ca. 15 mg of urea, 0.9 mg of $PO_4^{3-}$, 0.7 mmol $K^+$ and 2.5 μmol of phenol out of human hemofiltrate per gram of resin.

EXAMPLE 2

In order to perform acidic condensation, a solution which contained 1 Mol of resorcinol in 300 ml of water and 1 Mol of formaldehyde in the form of a 37% solution was slowly infused while being stirred, into a solution containing 0.5 Mol of $FeCl_3$ in 100 ml of 0.1 N—HCl. The result was a moisture-expanded preliminary product in the form of a solid body.

This preliminary product was made insoluble by means of heating and it was subsequently freed of ferric chloride by washing with diluted (0.01 N)HCl. The accumulation of further methylol groups was effected as in Example 1 at a pH of 8 to 10. The product obtained by this method was comparable with the resin obtained in accordance with Example 1.

EXAMPLE 3

This example describes the production of a phenol aldehyde resin, capable of bonding formaldehyde, by means of condensation with aldehyde in deficiency.

One Mol resorcinol and 0.5 Mol glutaric dialdehyde were acidically condensed in 500 ml of water with 1 N—$H_2SO_4$, oxalic acid or 1 N—HCl, with heat being applied, until the reaction began. The product of this process was comminuted to a grain size like that in Example 1 and then sieved, washed free of glutaric aldehyde and soluble compounds, and freeze-dried. The resin thus obtained absorbed up to 200 μmol of formaldehyde out of a solution at a temperature of 37° C., under physiological conditions.

EXAMPLE 4

The following tables indicate a comparison of known urea-absorption means with resins utilizable according to the invention, in terms of urea absorption.

Tables I and II illustrate the results of measurements made at 37° C., and Tables III and IV indicate values at temperatures deviating from 37° C. and at various concentrations.

References are made in the tables to the following locations in the literature:

(1) C. Giordano et al., Kidney Int., 10:284, 1976.
(2) E. Denti et al., Kidney Int., 7:400, 1975.
(3) K. Hintzen, itv-Informationen, 8:2, 18, 1978.
(4) C. Giordano et al., Kidney Int., 10:260, 1976.
(5) H.-K. Man, T. Drücke, Kidney Int., 10:269, 1976.
(6) C. Giordano, Kidney Int., 13:138–144, 1978.
(7) German Disclosure Document DE-OS No. 27 34 741.

(e) Measurements with resins having a urea solution and 0.9% NaCl.

The experiments were predominantly carried out under conditions which are present in hemofiltration and in accordance with clinical expectations, specifically:

a treatment time of 4 hours;
a temperature of 37° C.;
an average urea content of 225 mg %;
a quantity of 20 l solution to be prepared in 4 hours;
a physiological saline solution substantially containing ca. 0.9% NaCl.

The resins listed in Table IV were produced as follows:

A. Acidically condensed resin according to Example 2, omitting the second part of the Example and the addition of iron.
B. Alkaline-condensed resin according to Example 2, with the first step of preliminary condensation omitted.
C. Phenol-resorcinol mixture resin with 3 Mol of formaldehyde.
D. Resorcinol resin, with a method as described in Example 1, paragraph 2.
F. To a solution of 1 Mol of resorcinol in 100 ml $H_2O$, 3 Mol of formaldehyde as a 37% hydrous solution was added, and condensation was effected with 3 Mol of NaOH as a 27% hydrous solution, the solutions having previously been cooled to 1° C. The reaction began at once, whereupon the resin expanded in moisture.
G. The same initial step as in A; however, condensation was performed in a protective manner using less HCl at lower temperatures.

L. Phloroglucinol/formaldehyde resin, condensed in an alkaline fashion with 3 Mol of formaldehyde per Mol of phloroglucinol.
R. Phenol-hydroquinone-mixture resin in molar ratios as in Example 1.
S. Produced as in F. above, but with the exception that the formaldehyde solution and the NaOH solution were previously saturated with NaCl.
T. Produced according to Example L with calcium additionally condensed into it (0.1 Mol per Mol of resorcinol).

In order to perform the determinations of urea, 10 ml of test solutions, containing 150, 200, 300, 500, 1000 mg of urea each per 100 ml of 0.9% NaCl solution, were shaken together with 1 gram of dry resin substance after 5, 15, 30, 45, and 75 minutes and after 2 hours, 4 hours and 24 hours; the remnant urea concentration was measured photometrically. Since freeze-dried resins contain only a very little water (2 to 3%), they may be considered to be a dry substance.

TABLE I

| Type and Number | Temperature | Initial Concentration in mg/100 ml | Absorption Capacity (in mg/g of dry substance) | Reference to Literature |
|---|---|---|---|---|
| Activated Charcoals | | | | |
| Merck 2186 | 37° | 100 | 4.5 | 1 |
| Merck 2515 | 37° | 100 | 4.5 | 3 |
| Darco G 60 | 37° | 100 | 3.71 | 3 |
| Norit A | 37° | 100 | 5.51 | 3 |
| S 700 | 37° | 100 | 7.3 | 2 |
| K 400 | 37° | 100 | 4.9 | 2 |
| Average | | | 5.5 | |
| Ion Exchangers | | | | |
| Amberlite XAD 2 | 37° | 100 | 0.99 | 3 |
| Amberlite XAD 4 | 37° | 100 | 1.80 | 3 |
| Amberlite XAD 7 | 37° | 100 | 0.33 | 3 |
| Lewapol 18/65 | 37° | 100 | 2.98 | 3 |
| Lewatit OCI33 | 37° | 100 | 1.03 | 3 |
| Average | | | 1.42 | |
| Polysaccharides | | | | |
| Oxygenated Starch | 37° | 100 | 7.03 | 4 |
| Oxycellulose | 37° | 100 | 5.18 | 5 |
| | | | Reaction times here were not indicated | |

TABLE II

| Type and Number | Temperature | Initial Concentration in mg/100 ml | Absorption Capacity in mg/g of dry substance | Reference |
|---|---|---|---|---|
| Harz S | 37° | 218 | 16 | e |

TABLE III

| | | | | |
|---|---|---|---|---|
| Activated Charcoals | | | | |
| Merck 2186 | 1° | 100 | 11.28 | 1 |
| Darco G 60 | 2° | 100 | 5.78 | 3 |
| Norit A | 2° | 100 | 5.15 | 3 |
| Merck 2515 | 2° | 100 | 8.79 | 3 |
| Polysaccharides | | | | |
| Oxygenated starch | 60° | 100 | - (Gel) | |
| Oxycellulose | 60° | 100 | 12.95 | 5 |
| Oxycellulose | 0° pH 1 | | 60 | 6 |
| Other substances | | | | |
| Xanthhydrolane Polystyrene resin | ? | 356.2 | 12 mg/g Xanthhydrol no reaction time indicated | 7 |

TABLE IV

| Type and number of the resin utilizable according to the invention | Temperature | Initial Concentration in mg/100 ml | Absorption capacity in mg/g | Reference |
|---|---|---|---|---|
| A | 75° | 1000 | 64 after 75 min | e |
| | 75° | 400 | 20.7 after 75 min | e |
| | 75° | 150 | 12 after 75 min | e |
| | 25° | 200 | 8.9 after 4 h | |
| | | 500 | 27.6 after 4 h | |
| B | 25° | 200 | 17.2 after 4 h | e |
| C | 75° | 1000 | 11.59 after 75 min | |
| D | 25° | 200 | 15.84 after 4 h | |
| F | 25° | 200 | 11.62 after 4 h | |
| G | 25° | 200 | 16.78 after 4 h | |
| L | 25° | 200 | 12.27 after 4 h | |
| R | 25° | 200 | 16.47 after 4 h | |
| | 25° | 300 | 28.54 after 4 h | |
| | 25° | 500 | 53.72 after 4 h | |
| S | 25° | 200 | 18.61 after 4 h | |
| | | 300 | 28.5 after 4 h | |
| | | 500 | 54.2 after 4 h | |
| T | 25° | 1000 | 104 after 24 h | |

The results demonstrate that particularly at the temperature of 25° C., which is of particular interest physiologically, the resins utilizable according to the invention produce superior results compared with known urea absorption means.

The results of Table IV further demonstrate that resins having a large surface area are utilizable according to the invention in a particularly advantageous manner. A comparison of the urea absorption of resins F and S shows that resin F absorbs 11.62 mg of urea from a solution of 200 mg % of urea per gram of solid substance, while resin S absorbs 18.6 mg of urea per gram of solid substance; the conclusion to be drawn must be that the improved microporous properties must be due to the inclusion of salt and water during the manufacture of the resin. Condensing in monofunctional aldehydes and phenols is capable of attaining the same effect by chemical means.

If 10.0 Mol % of resorcinol was replaced with phenol (the same initial step as in resin F, but with 0.9 Mol of resorcinol and 0.1 Mol of phenol), then the urea absorption was not decreased, although a pure phenol formaldehyde resin (initial step as in resin F but with 1 Mol of phenol instead of 1 Mol of resorcinol) absorbed smaller quantities of urea.

It will be obvious to those skilled in the art that various changes may be made without departing from the scope of the invention and the invention is not to be considered limited to what is described in the specification.

What is claimed is:

1. A process for removing urea, ammonia, phenols and formaldehyde from an aqueous liquid, comprising: contacting said aqueous liquid with an incompletely condensed phenol/aldehyde resin having a large surface area, said incompletely condensed phenol/aldehyde resin comprising a condensation product of an aldehyde and resorcinol or phloroglucinol, said incompletely condensed phenol/aldehyde resin having free methylol groups in the ortho-position relative to the phenol hydroxyl group.

2. A process according to claim 1 wherein the aldehyde is formaldehyde.

3. A process according to claim 1 wherein said incompletely condensed phenol/aldehyde resin is precontacted with $K_2S_2O_5$, $KHSO_3$, sulfurous acid, $NaBH_4$ or mixtures thereof.

4. A process according to claim 1 or claim 3 wherein said phenol/aldehyde resin is pre-charged with calcium ions.

5. A process according to claim 1 wherein said incompletely condensed phenol/aldehyde resin has a theoretical absorption compacity for urea of about 170 mg/g.

6. A process according to claim 1 wherein said incompletely condensed phenol/aldehyde resin having a large surface area is prepared from said aldehyde and said resorcinol or phlorglucinol under acidic or alkaline conditions with the addition of water and a catalyst, with up to 4 moles of said aldehyde per mole of said phenol and wherein the condensation is carried out under mild conditions in the presence of comparatively large quantities of water and optionally a catalyst selected from the group consisting of compounds of calcium, magnesium, zinc and iron, whereby said incomplete condensation is effected so that free methylol groups remain in the ortho-position relative to the phenol hydroxyl group; followed by comminuting and drying the so incompletely condensed phenyl/aldehyde resin without effecting substantial heating thereof.

7. A process according to claim 1 wherein said aqueous liquid is physiological fluid, and said process involves the extra-renal cleaning of said physiological fluid.

8. A process according to claim 1 wherein said aqueous liquid is an ion exchange liquid and said process involves the cleaning of said aqueous ion exchange liquid to remove traces of amines therefrom.

9. In a dialysis machine containing means to absorb urea, or other waste products normally excreted in the urine, or mixtures thereof the improvement wherein said absorbtion means comprises an incompletely condensed phenol aldehyde resin having a large surface area consisting essentially of the condensation product of a phenol or mixture of phenols selected from resorcinol or phloroglucinol, condensed under acidic or alkaline conditions with the addition of water and a catalyst, with up to 4 Mol of formaldehyde per Mol of phenol or a mixture of formaldehyde and other aldehydes and wherein the condensation is carried out under mild conditions in the presence of comparatively large quantities of water and if needed with the addition of another phenol and/or aldehyde or an additive to the extent such that in the ortho-position relative to the phenol hydroxyl group, free methylol groups still remain and the further condensation thereof is prevented, said condensation product being comminuted and dried without substantial heat.

10. A dialysis machine according to claim 9, wherein said resin has been subjected to follow-up treatment with compounds in the form of hydrous solutions of $K_2S_2O_5$, $KHSO_3$, sulfurous acid, $NaBH_4$, or mixtures thereof.

11. A filter cartridge for the absorption of waste products including urea, ammonia and the like from swimming pools, aquariums or the like, or for use in a dialysis machine, the improvement wherein said cartridge contains as an absorption medium an incompletely condensed phenol aldehyde resin having a large surface area, said incompletely condensed phenol/aldehyde resin consisting essentially of a condensation product of an aldehyde and resorcinol or phloroglucinol, said incompletely condensed phenol/aldehyde resin having free methylol groups in the ortho-position relative to the phenol hydroxyl group.

12. A filter cartridge according to claim 11, wherein said incompletely condensed phenol/aldehyde resin having a large surface area is charged with calcium ions.

13. A cartridge according to claim 11 for hemofiltration or hemodialysis, comprising in series a first section containing activated charcoal, a second section containing a first said resin for absorption of waste products, and a third section containing a second said resin for absorbing formaldehyde.

14. A container element containing means to absorb urea, or other waste products normally excreted in the urine, or mixtures thereof the improvement wherein said absorption means comprises an incompletely condensed phenol/aldehyde resin having a large surface area, said incompletely condensed phenol/aldehyde resin comprising a condensation product of an aldehyde and resorcinol or phloroglucinol, said incompletely condensed phenol/aldehyde resin having free methylol groups in the ortho-position relative to the phenol hydroxyl group.

15. An element according to claim 14, wherein said incompletely condensed phenol/aldehyde resin has been subjected to followup treatment with compounds in the form of hydrous solutions of $K_2S_2O_5$, $KHSO_3$, sulfurous acid, $NaBH_4$, or mixtures thereof.

16. An element according to claim 15, wherein said resin is charged with calcium ions.

* * * * *